US012682813B2

(12) United States Patent
Pyo

(10) Patent No.: US 12,682,813 B2
(45) Date of Patent: Jul. 14, 2026

(54) LIGHT EMITTING DEVICE VOLTAGE SETTING METHOD DETERMINING WHETHER A BLACK FLOATING PHENOMENON HAS BEEN OBSERVED

(71) Applicant: Samsung Display Co., LTD., Yongin-si (KR)

(72) Inventor: Si Beak Pyo, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/019,164

(22) Filed: Jan. 13, 2025

(65) Prior Publication Data

US 2025/0384808 A1 Dec. 18, 2025

(30) Foreign Application Priority Data

Jun. 17, 2024 (KR) ........................ 10-2024-0078193
Aug. 19, 2024 (KR) ........................ 10-2024-0110241

(51) Int. Cl.
*G09G 3/3233* (2016.01)
*G09G 3/20* (2006.01)

(52) U.S. Cl.
CPC ......... *G09G 3/2074* (2013.01); *G09G 3/3233* (2013.01); *G09G 2300/0819* (2013.01); *G09G 2300/0842* (2013.01); *G09G 2300/0861* (2013.01); *G09G 2320/0233* (2013.01); *G09G 2320/0238* (2013.01); *G09G 2320/0242* (2013.01); *G09G 2320/0257* (2013.01); *G09G 2320/041* (2013.01);
(Continued)

(58) Field of Classification Search
CPC .......... G09G 3/30; G09G 3/32; G09G 3/3208; G09G 3/3216; G09G 3/3225; G09G 3/3233; G09G 3/3241; G09G 3/325; G09G 3/3258; G09G 3/3266; G09G 3/3275; G09G 3/3283; G09G 3/3291
USPC ...................................................... 345/76–83
See application file for complete search history.

(56) References Cited

U.S. PATENT DOCUMENTS

| | | | |
|---|---|---|---|
| 9,953,573 | B2 | 4/2018 | Pyo et al. |
| 10,714,021 | B2 | 7/2020 | Pyo et al. |
| 10,997,909 | B2 | 5/2021 | Pyo et al. |

(Continued)

FOREIGN PATENT DOCUMENTS

| | | | |
|---|---|---|---|
| KR | 10-2480483 | B1 | 12/2022 |
| KR | 10-2537993 | B1 | 6/2023 |

*Primary Examiner* — Ke Xiao
*Assistant Examiner* — Nelson Lam
(74) *Attorney, Agent, or Firm* — Womble Bond Dickinson (US) LLP

(57) ABSTRACT

In a voltage setting method of an electronic device, in which a plurality of sub-pixels are in a display device, and an anode initialization voltage applied to the plurality of sub-pixels is set, the voltage setting method includes: setting a data voltage for displaying an image having a black grayscale to an a-th level in the plurality of sub-pixels; applying the anode initialization voltage having a first level; determining whether a black floating phenomenon has been observed; decreasing the anode initialization voltage by a second level based on the black floating phenomenon being observed; applying the set anode initialization voltage; and writing a level of the set anode initialization voltage to the display device based on a determination that the black floating phenomenon has not been observed.

20 Claims, 5 Drawing Sheets

(52) U.S. Cl.
CPC ............... *G09G 2320/0673* (2013.01); *G09G 2330/023* (2013.01); *G09G 2330/028* (2013.01); *G09G 2360/16* (2013.01)

(56) References Cited

U.S. PATENT DOCUMENTS

| | | | | |
|---|---|---|---|---|
| 11,127,349 | B2 * | 9/2021 | Kobayashi | G09G 3/3233 |
| 2006/0022900 | A1 * | 2/2006 | Miyake | G09G 3/3291 345/55 |
| 2008/0291138 | A1 * | 11/2008 | Yamashita | G09G 3/3233 345/76 |
| 2011/0057925 | A1 * | 3/2011 | Miyake | G09G 3/3233 345/212 |
| 2014/0320549 | A1 * | 10/2014 | Kumeta | G09G 3/3225 345/77 |
| 2023/0101721 | A1 * | 3/2023 | Kodama | G09G 3/3233 345/212 |
| 2024/0282270 | A1 * | 8/2024 | Kubota | G09G 3/3266 |
| 2025/0252919 | A1 * | 8/2025 | Shin | G09G 3/3233 |

* cited by examiner

FIG. 3

300

310 320 330 340

| VAINT | | 0 | 0.15 | 0.2 | 0.25 | 0.3 |
|---|---|---|---|---|---|---|
| Vdata (0 Gray) | 4.8 | 0 | 0 | 0 | 0 | 0 |
| | 4.9 | 0 | 0 | 0 | 0 | 0 |
| | 5 | 0 | 0 | 0 | 0 | 0 |
| | 5.1 | 0 | 0 | 0 | 0 | 0 |
| | 5.2 | 61 | 39 | 23 | 5 | 0 |
| | 5.3 | 3 | 16 | 18 | 15 | 4 |
| | 5.4 | 0 | 5 | 10 | 17 | 10 |
| | 5.5 | 0 | 2 | 8 | 9 | 20 |
| | 5.6 | 0 | 0 | 3 | 11 | 6 |
| | 5.7 | 0 | 2 | 0 | 2 | 10 |
| | 5.8 | 0 | 0 | 2 | 3 | 8 |
| | 5.9 | 0 | 0 | 0 | 0 | 3 |
| | 6 | 0 | 0 | 0 | 0 | 1 |
| | 6.1 | 0 | 0 | 0 | 2 | 0 |
| | 6.2 | 0 | 0 | 0 | 0 | 1 |
| | 6.3 | 0 | 0 | 0 | 0 | 1 |
| | 6.4 | 0 | 0 | 0 | 0 | 0 |
| | 6.5 | 0 | 0 | 0 | 0 | 0 |
| | NG | 0 | 0 | 0 | 0 | 0 |
| SUM | | 64 | | | | |

LIGHT EMITTING DEVICE VOLTAGE SETTING METHOD DETERMINING WHETHER A BLACK FLOATING PHENOMENON HAS BEEN OBSERVED

CROSS-REFERENCE TO RELATED APPLICATION

The present application claims priority to and the benefit of Korean Patent Application No. 10-2024-0078193, filed on Jun. 17, 2024, and Korean Patent Application No. 10-2024-0110241, filed on Aug. 19, 2024, in the Korean Intellectual Property Office, the entire disclosures of each of which are incorporated herein by reference.

BACKGROUND

1. Field

Aspects of some embodiments of the present disclosure generally relate to an electronic device and a voltage setting method thereof.

2. Description of the Related Art

With the development of information technologies, the importance of a display device which is a connection medium between a user and information increases. Accordingly, display devices such as a liquid crystal display device and an organic light emitting display device are increasingly used.

Such a display device displays an image while changing frames at high speed, thereby providing higher immersion to a user. Further, it is necessary to control heat generated in the display device by lowering power consumption.

The above information disclosed in this Background section is only for enhancement of understanding of the background and therefore the information discussed in this Background section does not necessarily constitute prior art.

SUMMARY

Aspects of some embodiments include an electronic device and a voltage setting method thereof, in which display quality can be relatively improved and power consumption can be relatively reduced.

According to some embodiments of the present disclosure, there is provided a voltage setting method of an electronic device, in which a plurality of sub-pixels are in a display device, and an anode initialization voltage applied to the plurality of sub-pixels is set, the voltage setting method including: setting a data voltage for displaying an image having a black grayscale to an a-th level in the plurality of sub-pixels; applying the anode initialization voltage having a first level; determining whether a black floating phenomenon has been observed; decreasing the anode initialization voltage by a second level when the black floating phenomenon is observed; applying the set anode initialization voltage; and writing a level of the set anode initialization voltage to the display device when it is determined that the black floating phenomenon has not been observed.

According to some embodiments, the set anode initialization voltage may be applied, and it may be again determined that the black floating phenomenon has been observed.

According to some embodiments, the voltage setting method may further include determining whether the anode initialization voltage has exceeded a predetermined minimum value.

According to some embodiments, the determining of whether the anode initialization voltage has exceeded the predetermined minimum value may be performed after the decreasing of the anode initialization voltage by the second level.

According to some embodiments, the applying of the set anode initialization voltage may be performed when it is determined that the anode initialization voltage has exceeded the predetermined minimum value.

According to some embodiments, the voltage setting method may further include setting the anode initialization voltage to a third level when it is determined that the anode initialization voltage has not exceeded the predetermined minimum value.

According to some embodiments, the voltage setting method may further include: applying the anode initialization voltage having the third level; and determining whether the black floating phenomenon has been observed as the anode initialization voltage having the third level is applied.

According to some embodiments, the voltage setting method may further include: when the black floating phenomenon is observed as the anode initialization voltage having the third level is applied, increasing a level of the data voltage for displaying the image having the black grayscale by a b-th level; and determining whether the black floating phenomenon has been observed as the data voltage increased by the b-th level is applied.

According to some embodiments, based on a determination that the black floating phenomenon has been observed as the data voltage increased by the b-th level is applied, the level of the data voltage for displaying the image having the black grayscale may be increased by the b-th level.

According to some embodiments, the voltage setting method may further include writing the level of the set data voltage for displaying the image having the black grayscale to the display device when it is determined that the black floating phenomenon has not been observed as the data voltage increased by the b-th level is applied.

According to some embodiments, in the writing of the level of the set data voltage for displaying the image having the black grayscale to the display device, the level of the anode initialization voltage may be written as the third level to the display device.

According to some embodiments, the voltage setting method may further include: when the black floating phenomenon is not observed as the anode initialization voltage having the third level is applied, decreasing the level of the data voltage for displaying the image having the black grayscale by a c-th level; and determining whether the black floating phenomenon has been observed as the data voltage decreased by the c-th level is applied.

According to some embodiments, based on a determination that the black floating phenomenon has not been observed as the data voltage decreased by the c-th level is applied, the level of the data voltage for displaying the image having the black grayscale may be decreased by the c-th level.

According to some embodiments, the voltage setting method may include: increasing the level of the data voltage for displaying the image having the black grayscale by the c-th level when it is determined that the black floating phenomenon has not been observed as the data voltage increased by the c-th level is applied; and writing the level of the data voltage for displaying the image having the black grayscale to the display device.

According to some embodiments, in the writing of the level of the data voltage for displaying the image having the black grayscale to the display device, the level of the anode initialization voltage may be written as the third level to the display device.

According to some embodiments, at least one of the plurality of sub-pixels may include: a sub-pixel circuit configured to generate a driving current; and a light emitting element connected to the sub-pixel circuit, the light emitting element having the driving current flowing therethrough. According to some embodiments, the sub-pixel circuit may include an initialization transistor configured to switch an electrical connection between the light emitting element and a power line to which the anode initialization voltage is applied.

According to some embodiments, the power line to which the anode initialization voltage is applied may be a fourth power line. According to some embodiments, the light emitting element may include: a first electrode connected to the initialization transistor; a second electrode connected to a second power line to which a second power voltage is applied; and a light emitting layer located between the first electrode and the second electrode. According to some embodiments, a voltage difference between the first level and the second power voltage may be lower than a threshold voltage of the light emitting element.

According to some embodiments, the display device may further include: a display panel having the plurality of sub-pixels located therein; a power supply circuit configured to supply the anode initialization voltage to the display panel; and a timing controller configured to control the power supply circuit. According to some embodiments, in the writing of the level of the set anode initialization voltage to the display device, the level of the anode initialization voltage may be written to a memory of the timing controller.

According to some embodiments, the level of the data voltage for displaying the image having the black grayscale may be further stored in the memory of the timing controller.

According to some embodiments of the present disclosure, an electronic device includes: a display panel having a plurality of sub-pixels located therein, the display panel, wherein an anode initialization voltage is applied to the plurality of sub-pixels; a data driving circuit configured to supply a data voltage to the plurality of sub-pixels; a power supply circuit configured to supply the anode initialization voltage to the display panel; and a timing controller configured to control the data driving circuit with reference to a memory, and control the anode initialization voltage output from the power supply circuit to have a predetermined level, wherein the predetermined level is set by: setting the data voltage for displaying an image having a black grayscale to an a-th level in the plurality of sub-pixels; applying the anode initialization voltage having a first level to the display panel; determining whether a black floating phenomenon has been observed; decreasing the anode initialization voltage by a first level when it is determined that the black floating phenomenon has been observed; applying the set anode initialization voltage; and writing a level of the set anode initialization voltage to the display device when it is determined that the black floating phenomenon has not been observed.

BRIEF DESCRIPTION OF THE DRAWINGS

Aspects of some embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 3 is a table illustrating data obtained by experimenting while varying a level of a fourth power voltage and a level of a data voltage for displaying images having a black grayscale.

DETAILED DESCRIPTION

Figure 1:
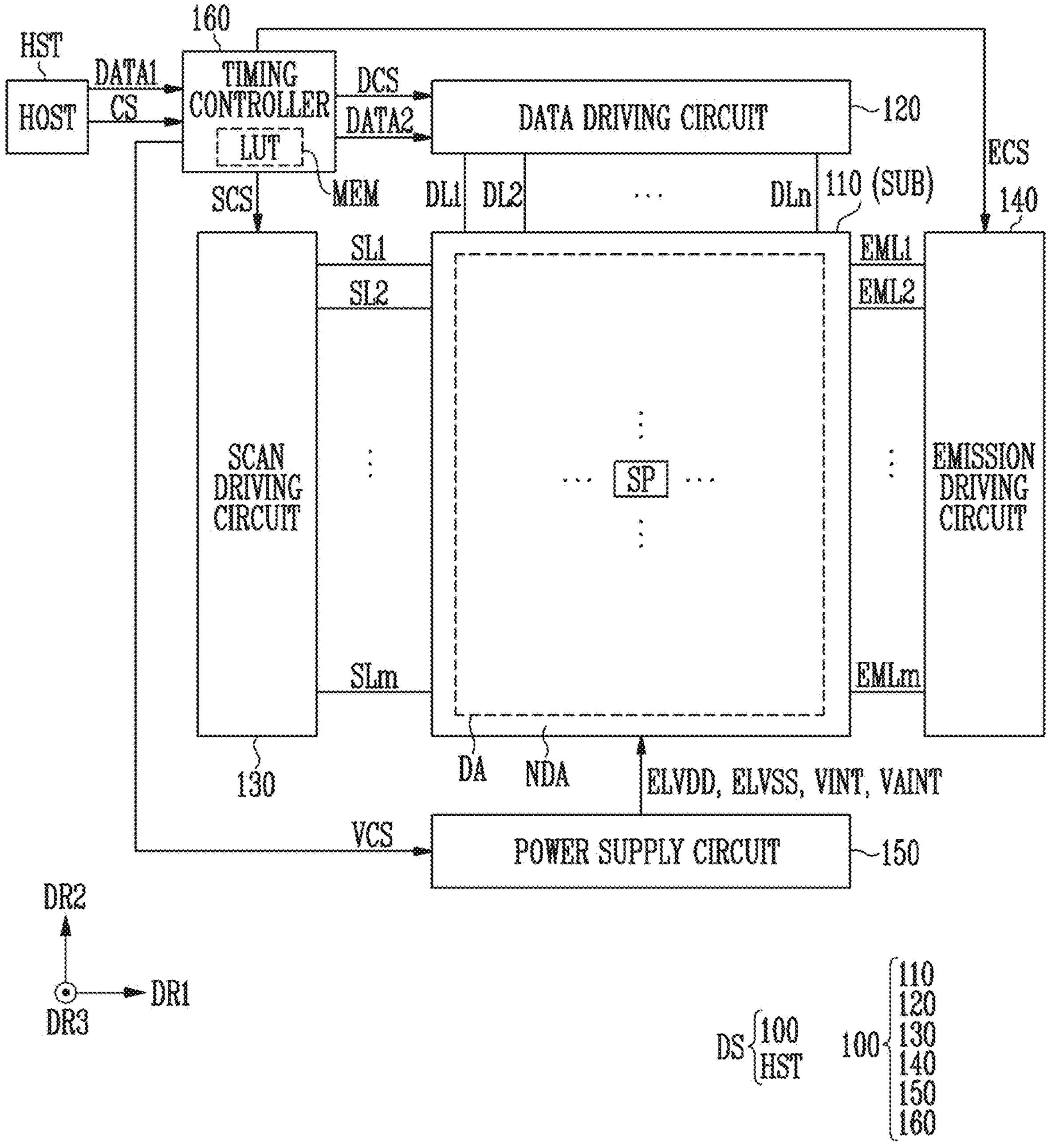
FIG. 1 is a system diagram of an electronic device according to some embodiments of the present disclosure.

Hereinafter, aspects of some embodiments are described in more detail with reference to the accompanying drawings so that those skilled in the art may easily practice the present disclosure. The present disclosure may be implemented in various different forms and is not limited to the disclosed embodiments described in the present specification.

A part irrelevant to the description will be omitted to clearly describe the present disclosure, and the same or similar constituent elements will be designated by the same reference numerals throughout the specification. Therefore, the same reference numerals may be used in different drawings to identify the same or similar elements.

In addition, the size and thickness of each component illustrated in the drawings are arbitrarily shown for better understanding and ease of description, but the present disclosure is not limited thereto. Thicknesses of several portions and regions are exaggerated for clear expressions.

In description, the expression "equal" may mean "substantially equal." That is, this may mean equality to a degree to which those skilled in the art can understand the equality. Other expressions may be expressions in which "substantially" is omitted.

It will be understood that, although the terms "first", "second," "a-th," "b-th," "c-th," and the like may be used herein to describe various elements, these elements should not be limited by these terms. These terms are only used to distinguish one element from another element. Thus, a "first" element discussed below could also be termed a "second" element without departing from the teachings of the present disclosure. As used herein, the singular forms are intended to include the plural forms as well, unless the context clearly indicates otherwise.

The terms "under," "beneath," "on," "above," and the like are used to describe a relationship between components illustrated in a drawing. The terms are relative and are described with reference to a direction indicated in the drawing.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically.

It will be further understood that the terms "includes" and/or "including", when used in this specification, specify the presence of stated features, integers, steps, operations, elements, and/or components, but do not preclude the presence and/or addition of one or more other features, integers, steps, operations, elements, components, and/or groups thereof.

Hereinafter, aspects of some embodiments of the present disclosure will be described in more detail with reference to the accompanying drawings.

FIG. 1 is a system diagram of an electronic device DS according to some embodiments of the present disclosure.

Referring to FIG. 1, the electronic device DS according to some embodiments of the present disclosure may include a display device 100 and a host HOST.

The display device 100 according to some embodiments of the present disclosure may include a display panel 110, a data driving circuit 120, a scan driving circuit 130, an emission driving circuit 140, a power supply circuit 150, a timing controller 160, and the like.

The display panel 110 may include a substrate SUB. A plurality of sub-pixels SP may be located in the display panel 110. The sub-pixels SP may be connected to a plurality of data lines DL1 to DLn (n is an integer of 2 or more), a plurality of scan lines SL1 to SLm (m is an integer of 2 or more), and a plurality of emission control lines EML1 to EMLm. At least one power line configured to apply a power voltage to the plurality of sub-pixels SP may be located in the display panel 110.

The display panel 110 may include a display area DA in which the plurality of sub-pixels SP are located and a non-display area NDA located in a peripheral area of the display area DA (e.g., an edge of the display area DA).

The display panel 110 may be formed flat, but embodiments of the present disclosure are not limited thereto. For example, the display panel 110 may include curved portions formed at left and right ends thereof. A curved surface may have a constant curvature or have a changed curvature. Besides, the display panel 110 may be formed flexible to be curvable, warpable, bendable, foldable, and rollable.

The plurality of data lines DL1 to DLn may extend in one direction in the display panel 110. The one direction may be, for example, a second direction DR2. The plurality of data lines DL1 to DLn may be located in the display panel 110 while extending in the second direction DR2 (e.g., entirely in the second direction DR2). The second direction DR2 may be, for example, a direction crossing from an upper side to a lower side of the display panel 110, but embodiments of the present disclosure are not limited thereto.

The plurality of scan lines SL1 to SLm may extend in one direction in the display panel 110. The one direction may be, for example, a first direction DR1. The plurality of scan lines SL1 to SLm may be located in the display panel 110 while extending in the first direction (e.g., entirely in the first direction DR1). The first direction DR1 may be a direction different from the second direction DR2, but embodiments of the present disclosure are not limited thereto. The first direction DR1 may be, for example, a direction crossing from a left side to a right side of the display panel 110.

The data driving circuit 120 may be configured to supply a data voltage to the plurality of data lines DL1 to DLn. The data driving circuit 120 may generate a data voltage, based on second image data DATA2 and a data driving circuit control signal DCS, and output the generated data voltage to the plurality of data lines DL1 to DLn in synchronization with a timing. The data driving circuit control signal DCS may include, for example, a Source Start Pulse (SSP) signal, a Source Shift Clock (SCC) signal, a Source Output Enable (SOE) signal, and the like.

The data driving circuit 120 may be implemented as an integrated circuit (e.g., a Source Driver Integrated Circuit (SDIC) formed separately form the display panel 110, and be formed together with the display panel 110 to be formed in at least a partial area on the non-display area NDA of the display panel 110.

The scan driving circuit 130 may be configured to output a scan signal to the plurality of scan lines SL1 to SLm in response to a scan driving circuit control signal SCS. The scan driving circuit control signal SCS may include a start signal indicating a start of a frame, a horizontal synchronization signal for outputting the scan signal in synchronization with a timing, and the like.

The emission driving circuit 140 may be configured to output an emission control signal to the plurality of emission control lines EML1 to EMLm in response to an emission driving circuit control signal ECS. The emission driving circuit control signal ECS may include a start signal indicating a start of a frame, a horizontal synchronization signal for outputting the emission control signal in synchronization with a timing, and the like.

The scan driving circuit 130 and/or the emission driving circuit 140 may be implemented as an integrated circuit (e.g., a Gate Driver Integrated Circuit (GDIC) formed separately form the display panel 110, and be formed together with the display panel 110 to be formed in at least a partial area on the non-display area NDA of the display panel 110.

The power supply circuit 150 may be configured to output a constant voltage having a constant voltage level. The power supply circuit 150 may output a power voltage (e.g., a first power voltage ELVDD, a second power voltage ELVSS, a third power voltage VINT, a fourth power voltage VAINT, or the like) supplied to the display panel 110. The fourth power voltage VAINT may be referred to as an anode initialization voltage. According to some embodiments, the power supply circuit 150 may output a voltage (e.g., a gate high voltage, a gate low voltage, or the like) supplied to the scan driving circuit 130. According to some embodiments, the power supply circuit 150 may output a voltage (e.g., a gamma voltage, a reference voltage, or the like) supplied to the data driving circuit 120. The power supply circuit 150 may include, for example, a regulator (e.g., a Low Dropout (LDO) regulator, or the like). The power supply circuit 150 may be implemented as, for example, a Power Management Integrated Circuit (PMIC). The power supply circuit 150 may be configured to output a power voltage to power lines in response to a power supply circuit control signal VCS.

The timing controller 160 may be configured to control the data driving circuit 120, the scan driving circuit 130, the emission driving circuit 140, the power supply circuit 150, and the like. The timing controller 160 may generate and output the control signals DCS, SCS, ECS, and VCS for controlling the data driving circuit 120, the scan driving circuit 130, the emission driving circuit 140, and the power supply circuit 150, based on a control signal CS (e.g., a synchronization signal, a clock signal, a data enable signal, or the like) input through the host HST. According to some embodiments, the timing controller 160 may generate the synchronization signal, the data enable signal, and the like therein, based on the control signal CS input through the host HST (e.g., information on a driving frequency (or frame rate) of images displayed on the display panel 110).

The timing controller 160 may receive first image data DATA1 input from the host HST, and align the input first image data DATA1 in a pixel row unit. The timing controller 160 may convert the input first image data DATA1 in synchronization with an interface (e.g., a set or predetermined interface) (e.g., a Low Voltage Differential Signaling (LVDS), a Display Port (DP), an embedded Display Port (eDP), or the like). The second image data DATA2 which the timing controller 160 outputs to the data driving circuit 120 may be one converted inside the timing controller 160 according to the interface (e.g., the set or predetermined interface).

The timing controller 160 may generate the second image data DATA2, based on the input first image data DATA1 and a sensing value. According to some embodiments, the second image data DATA2 may be one obtained by compensating form a change in characteristic value of a sub-pixel included in a pixel (e.g., a change in characteristic value according to degradation of a transistor or a light emitting element in the sub-pixel, or the like).

According to some embodiments, the timing controller 160 may be located in a logic type or logic component or logic circuit in the display device 100. According to some embodiments, the timing controller 160 may be formed in a processor type in the display device 100. The timing controller 160 may include at least one memory MEM. A lookup table LUT may be stored in the memory MEM.

According to some embodiments, data determining a level of the fourth power voltage VAINT provided through the power supply circuit 150 may be included in the lookup table LUT stored in the memory MEM. The level of the fourth power voltage VAINT may be determined through a method of determining a voltage level, which will be described later with reference to FIGS. 4 and 5.

According to some embodiments, data determining a level of a data voltage for displaying images having a black grayscale may be included in the lookup table LUT stored in the memory MEM. The level of the data voltage for display the image having the black grayscale may be determined through the method of determining the voltage level, which will be described later with reference to FIGS. 4 and 5.

The host HST may include a set-top box, an Application Processor (AP), and the like. According to some embodiments, the host HST may be a component at the outside of the display device 100, which is not included in the display device 100. According to some embodiments, the host HST may be mounted in the display device 100. The first image data DATA1 and the control signal CS may be transmitted/received between the host HST and the display device 100 through an interface. The interface may be, for example, a Serial Programming Interface (SPI), an Inter Integrated Circuit (I2C), a Mobile Industry Processor Interface (MIPI), or the like. However, embodiments of the present disclosure are not limited thereto.

The electronic device DS according to some embodiments of the present disclosure may include the display device 100 and the host HST.

In FIG. 1, circuits supplying signals, voltages, and the like to the display panel 110 are merely classified according to functions. For example, the data driving circuit 120 and the timing controller 160 may be formed in one integrated circuit. The data driving circuit 120 and the timing controller 160 may be ones classified in one integrated circuit according to functions in the display device 100.

The display device 100 according to some embodiments of the present disclosure may be used as a display screen of not only portable electronic devices such as a mobile phone, a smart phone, a tablet personal computer (PC), a mobile communication terminal, an electronic notebook, an electronic book, a portable multimedia player (PMP), a navigation system, and an ultra-mobile PC, but also various products such as a television, a notebook computer, a monitor, an advertisement board, and an Internet of things (IoT) device.

Figure 2:
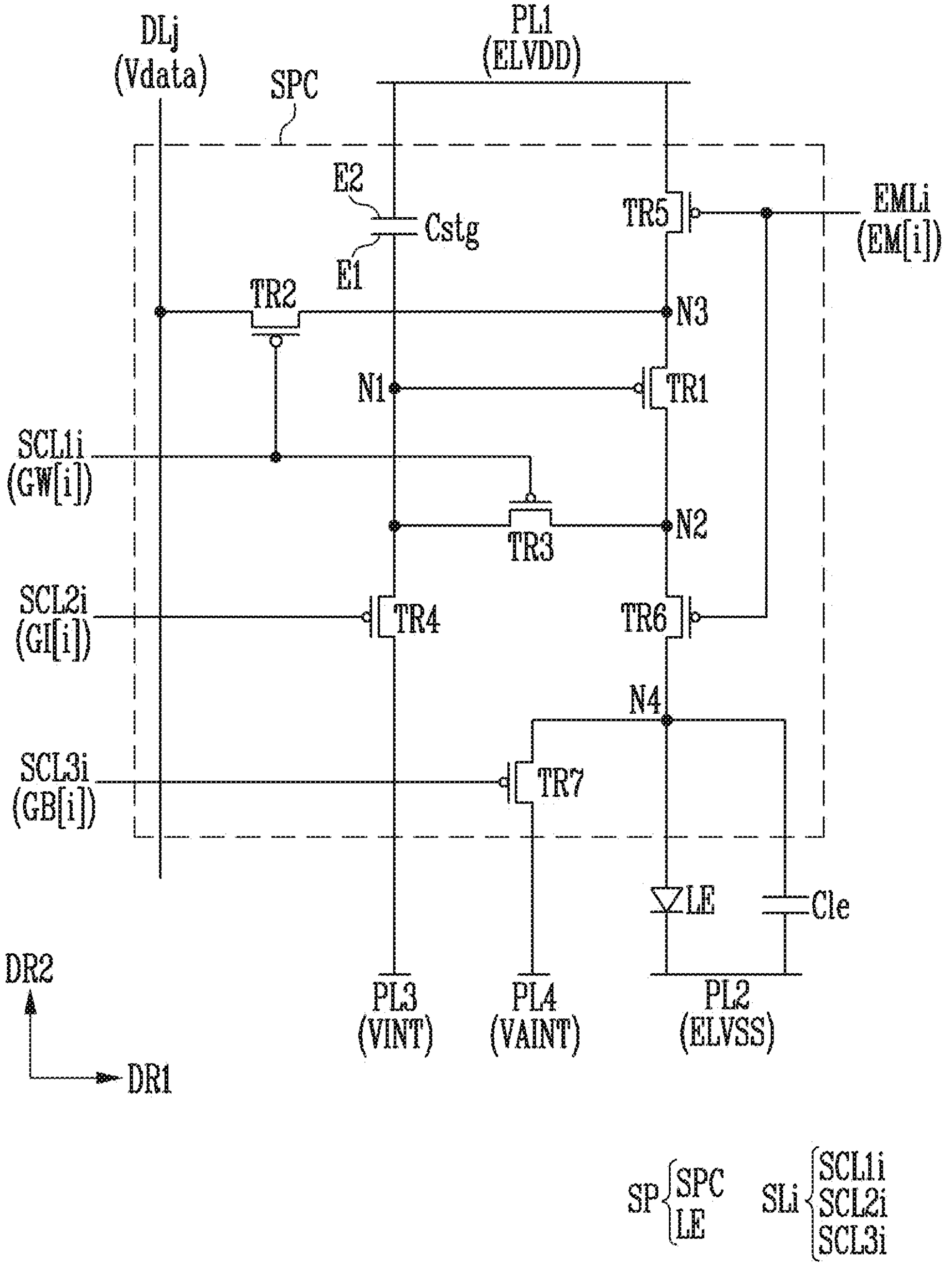
FIG. 2 is an equivalent circuit diagram of a sub-pixel according to some embodiments of the present disclosure.

FIG. 2 is an equivalent circuit diagram of a sub-pixel SP according to some embodiments of the present disclosure. Although FIG. 2 illustrates various components in a sub-pixel SP according to some embodiments of the present disclosure, according to some embodiments, the sub-pixel SP may include additional components or fewer components without departing from the spirit and scope of embodiments according to the present disclosure.

Referring to FIG. 2, the sub-pixel SP according to some embodiments of the present disclosure may include a sub-pixel circuit SPC and a light emitting element LE.

The sub-pixel circuit SPC may be connected to an ith scan line SLi (hereinafter, abbreviated as a scan line SLi), an ith emission control line EMLi (hereinafter, abbreviated as an emission control line EMLi), and a jth data line DLj (hereinafter, abbreviated as a data line DLj).

The scan line SLi may include two or more sub-scan lines. Referring to FIG. 2, the scan line SLi may include an ith first sub-scan line SCL1*i* (or abbreviated as a first sub-scan line SCL1*i*), an ith second sub-scan line SCL2*i* (or abbreviated as a second sub-scan line SCL2*i*), and an ith third sub-scan line SCL3*i* (or abbreviated as a third sub-scan line SCL3*i*).

The sub-pixel circuit SPC according to some embodiments of the present disclosure may include a plurality of switching elements. For example, the sub-pixel circuit SPC according to some embodiments of the present disclosure may include first to seventh transistors TR1 to TR7. The sub-pixel circuit SPC according to some embodiments of the present disclosure may include at least one storage element. The storage element may be implemented as, for example, a capacitor. For example, the sub-pixel circuit SPC according to some embodiments of the present disclosure may include a storage capacitor Cstg. Hereinafter, for convenience of description, a case where the sub-pixel circuit SPC according to some embodiments of the present disclosure seven transistors and one capacitor is described as an example. However, embodiments of the present disclosure are not limited thereto.

The first transistor TR1 may be configured to control a magnitude of a current (e.g., a driving current) supplied to the light emitting element LE. The first transistor TR1 may include a gate electrode connected to a first node N1, a first electrode connected to a third node N3, and a second electrode connected to a second node N2. A magnitude of a current (e.g., a drain current) flowing through the first transistor TR1 may be determined according to a magnitude of a voltage applied to the first node N1. The first electrode of the first transistor TR1 may be any one (e.g., a drain electrode) of a source electrode and the drain electrode, and the second electrode may be the other (e.g., the source electrode) of the source electrode and the drain electrode. The first transistor TR1 may be referred to as a driving transistor.

The second transistor TR2 may be configured to write a data voltage Vdata to the sub-pixel circuit SPC. The second transistor TR2 may be configured to switch an electrical connection between the data line DLj and the third node N3. The second transistor TR2 may include a gate electrode connected (e.g., electrically connected) to the first sub-scan line SCL1*i*. The second transistor TR2 may electrically connect between the data line DLj and the third node N3 in response to a first scan signal GW[i] (e.g., the first scan signal GW[i] having a turn-on level) applied to the first sub-scan line SCL1*i*. The second transistor TR2 may be referred to as a scan transistor.

The third transistor TR3 may be configured to switch an electrical connection between the first node N1 and the second node N2. The third transistor TR3 may be configured to compensate for a change in characteristic value (e.g., threshold voltage) of the first transistor TR1. The third transistor TR3 may include a gate electrode connected to the first sub-scan line SCL1*i*. The third transistor TR3 may electrically connect between the first node N1 and the second node N2 in response to the first scan signal GW[i] (e.g., the first scan signal GW[i] having the turn-on level) applied to the first sub-scan line SCL1*i*. When the third transistor TR3 is turned on, the first transistor TR1 may be diode-connected. The third transistor TR3 may be referred to as a compensation transistor.

The fourth transistor TR4 may be configured to switch an electrical connection between the first node N1 and a third power line PL3. The fourth transistor TR4 may include a gate electrode connected to the second sub-scan line SCL2*i*. The fourth transistor TR4 may electrically connect between the first node N1 and the third power line PL3 in response to a second scan signal GI[i] (e.g., the second scan signal GI[i] having a turn-on level) applied to the second sub-scan line SCL2*i*. When the fourth transistor TR4, the third power voltage VINT applied to the third power line PL3 may be applied to the first node N1. The fourth transistor TR4 may be referred to as a first initialization transistor.

The fifth transistor TR5 may be configured to switch an electrical connection between a first power line PL1 and the third node N3. The fifth transistor TR5 may include a gate electrode connected to the emission control line EMLi. The fifth transistor TR5 may electrically insulate between the first power line PL1 and the third node N3 in response to an emission control signal EM[i] (e.g., the emission control signal EM[i] having a turn-off level) applied to the emission control line EMLi. When the fifth transistor TR5 is turned on, the first power voltage ELVDD applied to the first power line PL1 may be applied to the third node N3. The fifth transistor TR5 may be referred to as a first emission control transistor.

The sixth transistor TR6 may be configured to switch an electrical connection between the second node N2 and a fourth node N4. The sixth transistor TR6 may include a gate electrode connected to the emission control line EMLi. The sixth transistor TR6 may electrically insulate between the second node N2 and the fourth node N4 in response to the emission control signal EM[i] (e.g., the emission control signal EM[i] having the turn-off level) applied to the emission control line EMLi. When the sixth transistor TR6 is turned on, the second node N2 and the fourth node N4 may be electrically connected to each other. The sixth transistor TR6 may be referred to as a second emission control transistor.

The seventh transistor TR7 may be configured to switch an electrical connection between the fourth node N4 and a fourth power line PL4. The seventh transistor TR7 may include a gate electrode connected to the third sub-scan line SCL3*i*. The seventh transistor TR7 may electrically connect between the fourth node N4 and the fourth power line PL4 in response to a third scan signal GB[i] (e.g., the third scan signal GB[i] having a turn-on level) applied to the third sub-scan line SCL3*i*. When the seventh transistor TR7 is turned on, the fourth power voltage VAINT applied to the fourth power line PL4 may be applied to the fourth node N4. The seventh transistor TR7 may be referred to as a second initialization transistor.

Referring to FIG. 2, it is illustrated that each of the first to seventh transistor TR1 to TR7 is a transistor including a P-type semiconductor. However, embodiments according to the present disclosure are not limited thereto. For example, at least one of the first to seventh transistors TR1 to TR7 may be implemented with a transistor including an N-type semiconductor.

Referring to FIG. 2, it is illustrated that the second transistor TR2 and the third transistor TR3 are connected to the same sub-scan line (e.g., the first sub-scan line SCL1*i*). However, embodiments according to the present disclosure are not limited thereto. For example, according to some embodiments in which the second transistor TR2 is implemented as a transistor including a P-type semiconductor and the third transistor TR3 is implemented as a transistor including an N-type semiconductor, the second transistor TR2 and the third transistor TR3 may be connected to different sub-scan lines.

The storage capacitor Cstg may be configured to maintain the magnitude of the voltage applied to the first node N1. The storage capacitor Cstg may include one electrode E1 connected to the first node N1 and the other electrode E2 connected to the first power line PL1. The storage capacitor Cstg may be configured to maintain a potential difference between the first node N1 and the first power line PL1.

The light emitting element LE may include a first electrode connected to the fourth node N4, a second electrode connected to a second power line PL2, and a light emitting layer located between the first electrode and the second electrode. The first electrode may be any one of an anode electrode and a cathode electrode, and the second electrode may be the other of the anode electrode and the cathode electrode. Hereinafter, for convenience of description, it is assumed and described that the first electrode is the anode electrode and the second electrode is the cathode electrode. The first electrode (e.g., the anode electrode) of the light emitting element LE may be connected (e.g., electrically connected) to the first power line PL1 through the sub-pixel circuit SPC. The second electrode (e.g., the cathode electrode) of the light emitting element LE may be connected to the second power line PL2. The second power voltage ELVSS may be applied to the second power line PL2.

In the equivalent circuit diagram, the light emitting element LE may include a capacitor component Cle. The capacitor component Cle may be formed by using the anode electrode of the light emitting element as one electrode, using the cathode electrode of the light emitting element as the other electrode, and using, as an insulating layer, the light emitting element located between the anode electrode and the cathode electrode.

When the seventh transistor TR7 is turned on, the fourth power voltage VAINT may be applied to the fourth node N4. The level of the fourth power voltage VAINT may be equal to a level of the second power voltage ELVDD or be set within a range higher than the level of the second power voltage ELVDD.

Meanwhile, a charge corresponding to a potential difference between the fourth power voltage VAINT and the second power voltage ELVSS may be stored in the capacitor component Cle of the light emitting element LE. When a potential difference between both ends of the capacitor component Cle becomes highest within a range in which the potential difference does not exceed a threshold voltage of the light emitting element LE, the length of a period required when the light emitting element LE emits light may be shortened. Accordingly, this is helpful in rapidly changing frames in image reproduction. In addition, a problem in that an emission time of the light emitting element LE varies as the capacitance of the capacitor component Cle of the light emitting element LE varies according to external temperature is reduced or prevented, so that a problem in that a luminance is changed depending on temperature, a problem in that a color blurring phenomenon occurs, and the like can be relatively reduced.

Also, meanwhile, from the viewpoint of relatively reducing power consumption, it is advantageous that a data voltage Vdata having a level as low as possible is applied within a range in which the light emitting element LE does not emit light when the sub-pixel SP displays an image having a black grayscale (or grayscale 0).

Referring to this, because the fourth power voltage VAINT is continuously input to the sub-pixel circuit SPC not only when the image having the black grayscale is displayed but also when an image having various grayscales is displayed, it may be advantageous to increase the level of the fourth power voltage VAINT as high as possible so as to relatively improve display quality, as compared with a case where the level of a data voltage Vdata for displaying the image having the black grayscale is decreased.

Accordingly, from the viewpoint of the display panel 110 (see FIG. 1), there is required a method of setting the level of the fourth power voltage VAINT to be as high as possible and setting the level of the data voltage Vdata for displaying the image having the black grayscale to be as low as possible, based on the set fourth power voltage VAINT. In the embodiments of the present disclosure, a method of setting the fourth power voltage VAINT with a high level and the data voltage Vdata for displaying the image having the black grayscale with a low level will be described later with reference to FIGS. 3 to 5.

FIG. 3 is a table 300 illustrating data obtained by experimenting while varying a level of a fourth power voltage 310 and a level of a data voltage 330 for displaying an image having a black grayscale.

In the table 300, "VAINT" indicates the fourth power voltage 310, and "Vdata (0 Gray)" indicates the data voltage 330 for displaying the image having the black grayscale.

The level of the fourth power voltage 310 may be, for example, one obtained by considering the level of the second power voltage ELVSS as a ground voltage, and writing a voltage difference from the above-described second power voltage ELVSS as the level of the fourth power voltage 310.

The experiment shown in FIG. 3 was performed by dividing the level of the fourth power voltage 310 into five classes 320 and dividing the level of the data voltage 330 for displaying the image having the black grayscale into eighteen classes. For example, the experiment shown in FIG. 3 was performed by setting the level of the fourth power voltage 310 to any one of 0 V (Volt), 0.15 V, 0.2 V, 0.25 V, and 0.3 V, and increasing the level of the data voltage 330 for displaying the image having the black grayscale from 4.8 V to 6.5 in a unit of 0.1 V. In addition, a number of samples in which a luminance of the display panel 110 (see FIG. 1) became a luminance (e.g., a set or predetermined luminance) (e.g., 0.001 nit) or less was recorded. The number of samples is 64, which is constant, with respect to each of the classes 320, and the number of samples in each of the classes 320 is written in a "SUM" item 340.

Experimental results will be described as follows with reference to the table 300.

When the level of the fourth power voltage VAINT was 0 V, in 61 samples among the 64 samples, it was measured that, when the level of the data voltage 330 for displaying the image having the black grayscale was 5.2 V, the luminance of the display panel was the luminance (e.g., the set or predetermined luminance) or less. In addition, in the other three samples, it was measured that, when the level of the data voltage 330 for displaying the image having the black grayscale was 5.3 V, the luminance of the display panel was the predetermined luminance or less.

When the level of the fourth power voltage VAINT was 0.15 V, in 39 samples among the 64 samples, it was measured that, when the level of the data voltage 330 for displaying the image having the black grayscale was 5.2 V, the luminance of the display panel was the predetermined luminance or less. In 16 samples among the other three samples, it was measured that, when the level of the data voltage 330 for displaying the image having the black grayscale was 5.3 V, the luminance of the display panel was the predetermined luminance or less. In 5 samples among the other three samples, it was measured that, when the level of the data voltage 330 for displaying the image having the black grayscale was 5.4 V, the luminance of the display panel was the predetermined luminance or less. In 2 samples among the other three samples, it was measured that, when the level of the data voltage 330 for displaying the image having the black grayscale was 5.4 V, the luminance of the display panel was the predetermined luminance or less. In 2 samples among the other three samples, it was measured that, when the level of the data voltage 330 for displaying the image having the black grayscale was 5.5 V, the luminance of the display panel was the predetermined luminance or less. In 2 samples among the other three samples, it was measured that, when the level of the data voltage 330 for displaying the image having the black grayscale was 5.7 V, the luminance of the display panel was the predetermined luminance or less.

When the level of the fourth power voltage VAINT was 0.2 V, in 23 samples among the 64 samples, it was measured that, when the level of the data voltage 330 for displaying the image having the black grayscale was 5.2 V, the luminance of the display panel was the predetermined luminance or less. In 18 samples among the other three samples, it was measured that, when the level of the data voltage 330 for displaying the image having the black grayscale was 5.3 V, the luminance of the display panel was the predetermined luminance or less. In 10 samples among the other three samples, it was measured that, when the level of the data voltage 330 for displaying the image having the black grayscale was 5.4 V, the luminance of the display panel was the predetermined luminance or less. In 8 samples among the other three samples, it was measured that, when the level of the data voltage 330 for displaying the image having the black grayscale was 5.5 V, the luminance of the display panel was the predetermined luminance or less. In 3 samples among the other three samples, it was measured that, when the level of the data voltage 330 for displaying the image having the black grayscale was 5.6 V, the luminance of the display panel was the predetermined luminance or less. In 2 samples among the other three samples, it was measured that, when the level of the data voltage 330 for displaying the image having the black grayscale was 5.8 V, the luminance of the display panel was the predetermined luminance or less. When the level of the fourth power voltage VAINT was 0.25 V, in 5 samples among the 64 samples, it was measured that, when the level of the data voltage 330 for displaying the image having the black grayscale was 5.2 V, the luminance of the display panel was the predetermined luminance or less. In 15 samples among the other three samples, it was measured that, when the level of the data voltage 330 for displaying the image having the black grayscale was 5.3 V, the luminance of the display panel was the predetermined luminance or less. In 17 samples among the other three samples, it was measured that, when the level of the data voltage 330 for displaying the image having the black grayscale was 5.4 V, the luminance of the display panel was the predetermined luminance or less. In 9 samples among the other three samples, it was measured that, when the level of the data voltage 330 for displaying the image having the black grayscale was 5.5 V, the luminance of the display panel was the predetermined luminance or less. In 11 samples among the other three samples, it was measured that, when the level of the data voltage 330 for displaying the image having the black grayscale was 5.6 V, the luminance of the display panel was the predetermined luminance or less. In 2 samples among the other three samples, it was measured that, when the level of the data voltage 330 for displaying the image having the black grayscale was 5.7 V, the luminance of the display panel was the predetermined luminance or less. In 3 samples among the other three samples, it was measured that, when the level of the data voltage 330 for displaying the image having the black grayscale was 5.8 V, the luminance of the display panel was the predetermined luminance or less. In 2 samples among the other three samples, it was measured that, when the level of the data voltage 330 for displaying the image having the black grayscale was 6.1 V, the luminance of the display panel was the predetermined luminance or less.

When the level of the fourth power voltage VAINT was 0.3 V, in 4 samples among the 64 samples, it was measured that, when the level of the data voltage 330 for displaying the image having the black grayscale was 5.3 V, the luminance of the display panel was the predetermined luminance or less. In 10 samples among the other three samples, it was measured that, when the level of the data voltage 330 for displaying the image having the black grayscale was 5.4 V, the luminance of the display panel was the predetermined luminance or less. In 20 samples among the other three samples, it was measured that, when the level of the data voltage 330 for displaying the image having the black grayscale was 5.5 V, the luminance of the display panel was the predetermined luminance or less. In 6 samples among the other three samples, it was measured that, when the level of the data voltage 330 for displaying the image having the black grayscale was 5.6 V, the luminance of the display panel was the predetermined luminance or less. In 10 samples among the other three samples, it was measured that, when the level of the data voltage 330 for displaying the image having the black grayscale was 5.7 V, the luminance of the display panel was the predetermined luminance or less. In 8 samples among the other three samples, it was measured that, when the level of the data voltage 330 for displaying the image having the black grayscale was 5.8 V, the luminance of the display panel was the predetermined luminance or less. In 3 samples among the other three samples, it was measured that, when the level of the data voltage 330 for displaying the image having the black grayscale was 5.9 V, the luminance of the display panel was the predetermined luminance or less. In one sample among the other three samples, it was measured that, when the level of the data voltage 330 for displaying the image having the black grayscale was 6.0 V, the luminance of the display panel was the predetermined luminance or less. In one sample among the other three samples, it was measured that, when the level of the data voltage 330 for displaying the image having the black grayscale was 6.2 V, the luminance of the display panel was the predetermined luminance or less. In one sample among the other three samples, it was measured that, when the level of the data voltage 330 for displaying the image having the black grayscale was 6.3 V, the luminance of the display panel was the predetermined luminance or less.

Meanwhile, when the level of the fourth power voltage VAINT exceeds a predetermined level (e.g., 0.7 V), the level of the fourth power voltage VAINT may become higher than the threshold voltage of the light emitting element LE (see FIG. 2). The image having the black grayscale may not be displayed. Therefore, the level of the fourth power voltage VAINT may be within a range in which the level of the fourth power voltage VAINT is lower than the threshold voltage of the light emitting element LE. For example, the level of the fourth power voltage VAINT may not exceed a maximum of 0.7 V.

Also, meanwhile, the level of the fourth power voltage VAINT may be set within a range in which a display quality (e.g., a set or predetermined display quality) is satisfied. An evaluation standard for the above-described display quality may include evaluations for the problem in that frames are rapidly changed, the problem in that a luminance is changed depending on temperature, the problem in that a color blurring phenomenon occurs, and the like, which are described above. When the level of the fourth power voltage VAINT is excessively low, deterioration of the above-described display quality occurs, and therefore, the fourth power voltage VAINT may be set to a level (e.g., a set or predetermined level) or more. For example, the level of the fourth power voltage VAINT may be set to a minimum of 0.25 V or more.

Figure 4:
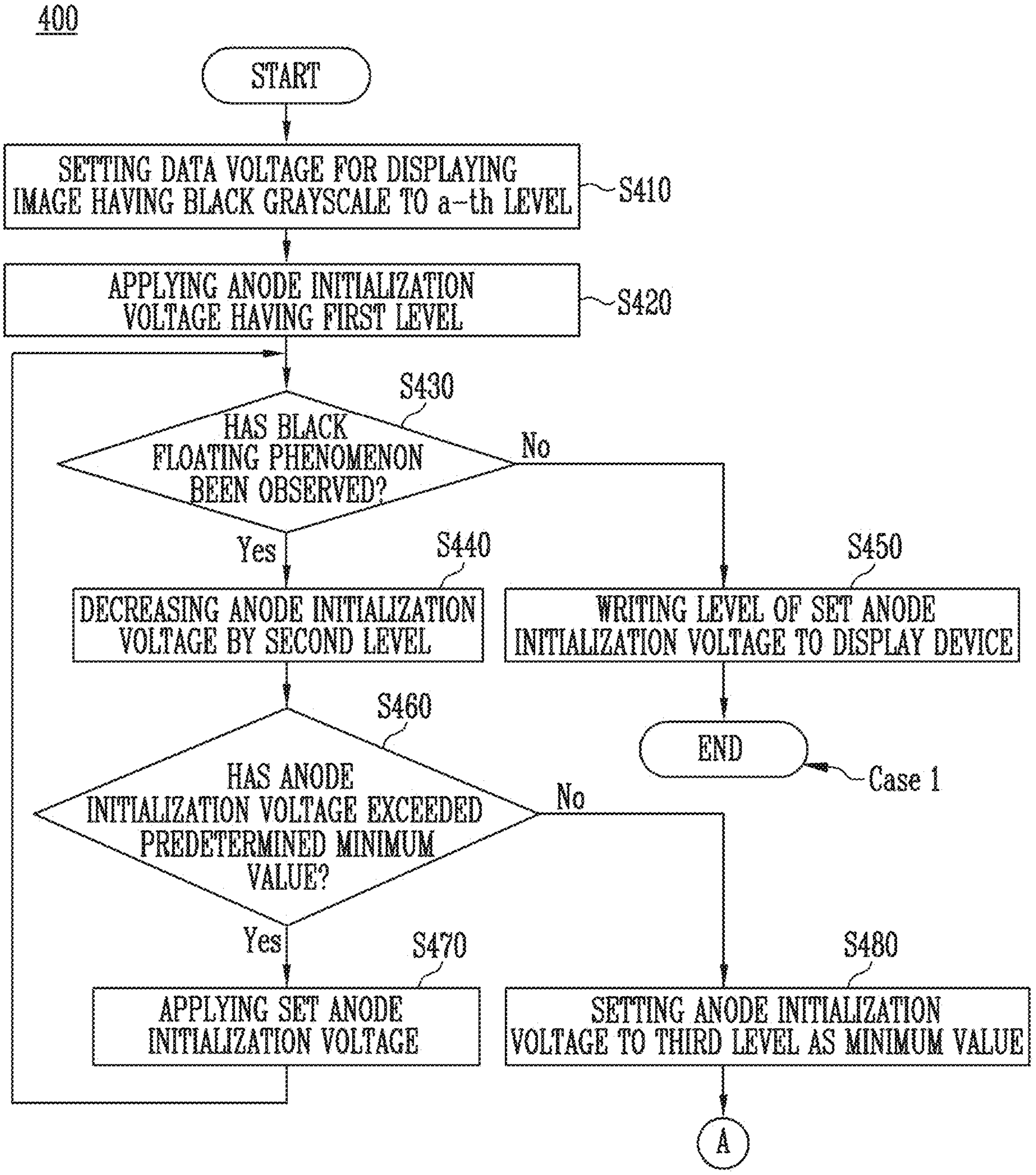
FIGS. 4 and 5 are flowcharts illustrating aspects of a voltage setting method of the electronic device according to some embodiments of the present disclosure.
Figure 5:
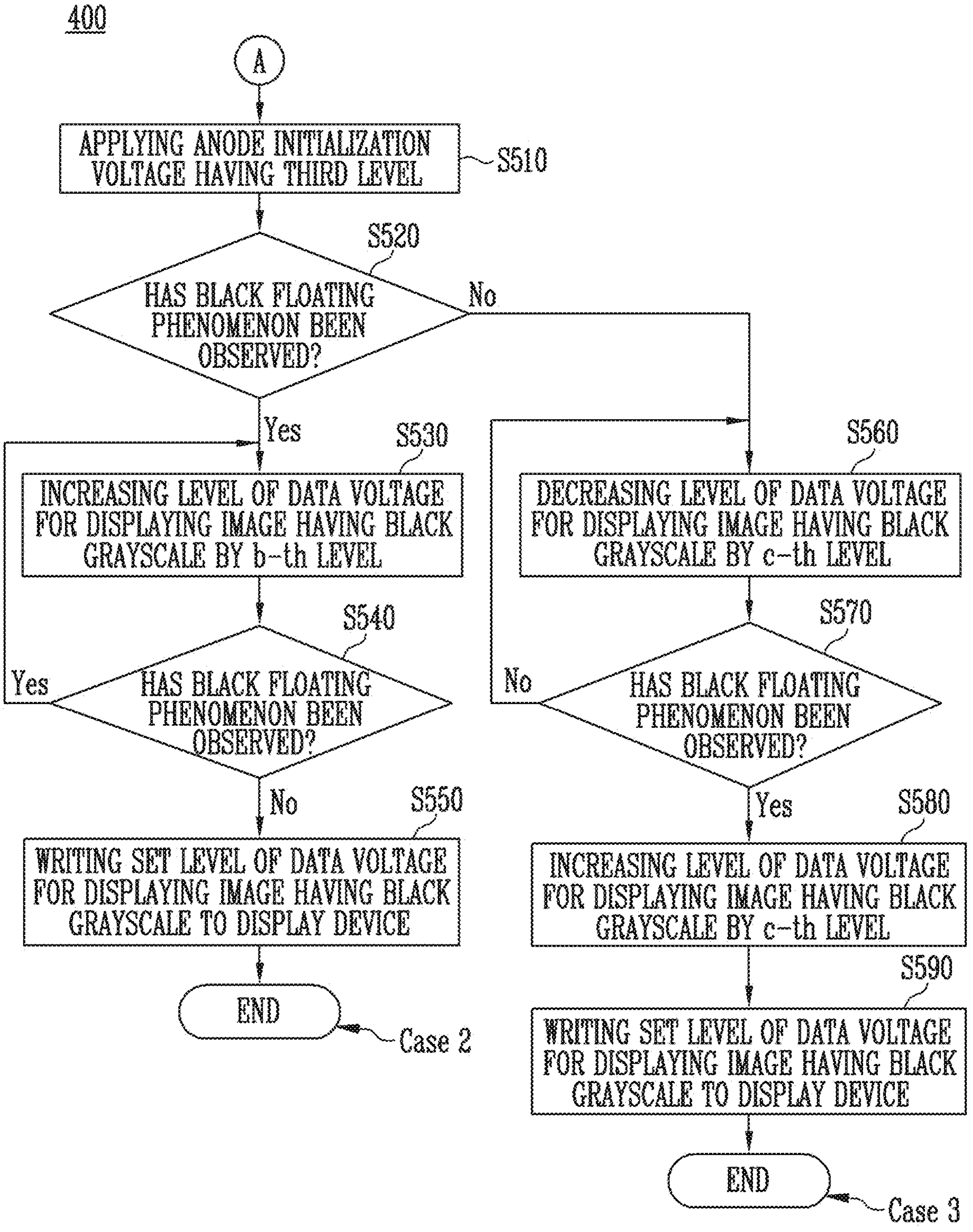

FIGS. 4 and 5 are flowcharts illustrating a voltage setting method 400 of the electronic device according to some embodiments of the present disclosure. Although FIGS. 4 and 5 illustrate various operations in a voltage setting method, embodiments according to the present disclosure are not limited thereto, and according to various embodiments, the voltage setting method may include additional operations or fewer operations, or the order of operation may vary, unless otherwise state or implied, without departing from the spirit and scope of embodiments according to the present disclosure.

In FIGS. 4 and 5, an anode initialization voltage may correspond to the above-described fourth power voltage VAINT shown in FIG. 2.

The voltage setting method 400 according to some embodiments of the present disclosure may include a first case, a second case, and a third case.

The first case is a case where the anode initialization voltage is set within a range in which the anode initialization voltage is higher than a minimum value.

The second case is a case where the anode initialization voltage is set to have the minimum value, and a level of a data voltage for displaying an image having a black grayscale is set while the data voltage is increased.

The third case is a case where the anode initialization voltage is set to have the minimum value, and the level of the data voltage for displaying the image having the black grayscale is set while the data voltage is decreased.

The first case is as follows.

The voltage setting method 400 according to some embodiments of the present disclosure may include operation S410 of setting the data voltage for displaying the image having the black grayscale to an a-th level, operation S420 of applying an anode initialization voltage having a first level, operation S430 of determining whether a black floating phenomenon has been observed, operation S440 of decreasing the anode initialization voltage by a second level, operation S460 of determining whether the anode initialization voltage has exceeded a minimum value (e.g., a set or predetermined minimum value), operation S470 of applying the set anode initialization voltage, and operation S450 of writing a level of the set anode initialization voltage to the display device.

In the operation S410 of setting the data voltage for displaying the image having the black grayscale to the a-th level, the a-th level may be freely set according to a design of a person skilled in the art. In an example, referring to the above-described table 300 shown in FIG. 3, when the level of the fourth power voltage 30 is set as 0.3 V, 5.5 V as the level of the data voltage 300 for displaying the image having the black grayscale, which corresponds to 20 as a most frequent value, may be set to the a-th level. However, embodiments of the present disclosure are not limited thereto.

In the operation S420 of applying the anode initialization voltage having the first level, the first level may be freely set according to a design of a person skilled in the art. In an example, the first level may be set to 0.7 V as a maximum level of the anode initialization voltage (or the fourth power voltage), but embodiments of the present disclosure are not limited thereto.

In the operation S430 of determining whether the black floating phenomenon has been observed, the black floating phenomenon represents that a luminance of the display panel exceeds a predetermined luminance when the data voltage for displaying the image having the black grayscale is applied, and the predetermined luminance may be freely set according to a design of a person skilled in the art. In an example, the predetermined luminance may be set to about 0.001 nit, but embodiments of the present disclosure are not limited thereto.

In the operation S440 of decreasing the anode initialization voltage by the second level, the second level may be freely set according to a design of a person skilled in the art. In an example, the second level may be set to about 0.01 V, but embodiments of the present disclosure are not limited thereto.

In the operation S460 of determining whether the anode initialization voltage has exceeded the predetermined minimum value, the predetermined minimum value may be freely set according to a design of a person skilled in the art. In an example, the predetermined minimum value may be about 0.25 V, but embodiments of the present disclosure are not limited thereto.

In the operation S450 of writing the level of the set anode initialization voltage to the display device, the level of the set anode initialization voltage may be stored in the form of a lookup table LUT in the memory MEM (see FIG. 1) of the above-described timing controller 160 (see FIG. 1). In the same operation S450, the level of the data voltage for displaying the image having the black grayscale may be stored while being set as the a-th level.

In the first case, in the operation S430 of determining whether the black floating phenomenon has been observed, the operation S440 of decreasing the anode initialization voltage by the second level when the black floating phenomenon is observed. In the operation S460 of determining whether the anode initialization voltage has exceeded to the predetermine minimum value, the operation S470 of applying the set anode initialization voltage when the anode initialization voltage exceeds the predetermined minimum value. In the operation S430 of determining whether the black floating phenomenon has been observed, the operation S450 of writing the level of the set anode initialization voltage to the display device may be performed when the black floating phenomenon is not observed.

Accordingly, in the first case, the level of the anode initialization voltage can become highest. In addition, the data voltage for displaying the image having the black grayscale, which has a lowest level, in the anode initialization voltage having the corresponding level can be set.

The second case is as follows.

The voltage setting method 400 according to some embodiments of the present disclosure may include operation S410 of setting a data voltage for displaying an image having a black grayscale to an a-th level, operation S420 of applying an anode initialization voltage having a first level, operation S430 of determining whether a black floating phenomenon has been observed, operation S440 of decreasing the anode initialization voltage by a second level, operation S460 of determining whether the anode initialization voltage has exceeded a predetermined minimum value, operation S480 of setting the anode initialization voltage to a third level as the minimum value, operation S510 of applying the anode initialization voltage having the third level, operation S520 of determining whether the black floating phenomenon has been observed, operation S530 of increasing a level of the data voltage for displaying the image having the black grayscale by a b-th level, operation S540 of determining whether the black floating phenomenon has been observed, and operation S550 of writing the level of the data voltage for displaying the image having the black grayscale to the display device.

In the operation S460 of determining whether the anode initialization voltage has exceeded the predetermined minimum value, the anode initialization voltage may be set to the third level as the minimum value when the anode initialization voltage does not exceed the predetermined minimum value. The third level may be freely set according to a design of a person skilled in the art. For example, the third level may be the above-described 0.25 V, but embodiments of the present disclosure are not limited thereto.

In the operation S520 of determining whether the black floating phenomenon has been observed, the operation S530 of increasing the level of the data voltage for displaying the image having the black grayscale by the b-th level may be performed when it is determined that the black floating phenomenon has been observed. The b-th level may be freely set according to a design of a person skilled in the art. For example, the b-th level may be set within a range larger than the range of the above-described second level. The b-th level may be about 0.1 V, but embodiments of the present disclosure are not limited thereto.

In the operation S540 of determining whether the black floating phenomenon has been observed, the operation S530 of increasing the level of the data voltage for displaying the image having the black grayscale by the b-th level may be performed when it is determined that the black floating phenomenon has been observed.

In the operation S540 of determining whether the black floating phenomenon has been observed, the operation S550 of writing the level of the data voltage for displaying the image having the black grayscale to the display device may be performed when it is determined that the black floating phenomenon has not been observed. In the same operation S550, the level of the anode initialization voltage may be stored while being set to the third level. The level of the set data voltage for displaying the image having the black grayscale and the level of the set anode initialization voltage may be stored in the form of a lookup table LUT in the memory MEM (see FIG. 1) of the above-described timing controller 160 (see FIG. 1).

Accordingly, in the second case, the level of the anode initialization voltage can be set to satisfy a predetermined display quality, and the image having the black grayscale can be stably displayed.

The third case is as follows.

The voltage setting method 400 according to some embodiments of the present disclosure may include operation S410 of setting a data voltage for displaying an image having a black grayscale to an a-th level, operation S420 of applying an anode initialization voltage having a first level, operation S430 of determining whether a black floating phenomenon has been observed, operation S440 of decreasing the anode initialization voltage by a second level, operation S460 of determining whether the anode initialization voltage has exceeded a predetermined minimum value, operation S480 of setting the anode initialization voltage to a third level as the minimum value, operation S510 of applying the anode initialization voltage having the third level, operation S520 of determining whether the black floating phenomenon has been observed, operation S560 of decreasing a level of the data voltage for displaying the image having the black grayscale by a c-th level, operation S570 of determining whether the black floating phenomenon has been observed, operation S580 of increasing the level of the data voltage for displaying the image having the black grayscale by the c-th level, and operation S590 of writing the level of the set data voltage for displaying the image having the black grayscale to the display device.

In the operation S520 of determining whether the black floating phenomenon has been observed, the operation S560 of decreasing the level of the data voltage for displaying the image having the black grayscale by the c-th level may be performed when it is determined that the black floating phenomenon has not been observed.

In the operation S560 of decreasing the level of the data voltage for displaying the image having the black grayscale by the c-th level, the c-th level may be freely set according to a design of a person skilled in the art. In an example, the c-th level may be equal to the b-th level. In an example, the c-th level about 0.1 V. However, embodiments of the present disclosure are not limited thereto.

In the operation S570 of determining whether the black floating phenomenon has been observed, the operation S580 of increasing the level of the data voltage for displaying the image having the black grayscale by the c-th level may be performed when it is determined that the black floating phenomenon has been observed. Accordingly, the level of the data voltage for displaying the image having the black grayscale may be set to be lowest within a range in which the black floating phenomenon does not occur.

In the operation S590 of writing the level of the set data voltage for displaying the image having the black grayscale to the display device, the level of the data voltage for displaying the image having the black grayscale may be stored in the form of a lookup table LUT in the memory MEM (see FIG. 1) of the above-described timing controller 160 (see FIG. 1). In the same operation S590, the level of the anode initialization voltage may be stored while being set to the third level.

Accordingly, in the third case, the level of the anode initialization voltage can be set to satisfy a predetermined display quality, and the level of the data voltage for displaying the image having the black grayscale is set to be lowest, so that power consumption can be relatively reduced.

In the electronic device and the voltage setting method thereof according to some embodiments of the present disclosure, display quality can be relatively improved and power consumption can be relatively reduced.

Aspects of some embodiments of the present disclosure have been disclosed herein, and although specific terms are employed, they are used and are to be interpreted in a generic and descriptive sense only and not for purpose of limitation. According to some embodiments, as would be apparent to one of ordinary skill in the art as of the filing of the present application, features, characteristics, and/or elements described in connection with particular embodiments may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims, and their equivalents.

What is claimed is:

1. A voltage setting method of an electronic device, in which a plurality of sub-pixels are disposed in a display device, and an anode initialization voltage being applied to the plurality of sub-pixels is set to a plurality of voltage levels, the voltage setting method comprising:

- setting a data voltage for displaying an image having a black grayscale to a first level to the plurality of sub-pixels;
- applying the anode initialization voltage to the plurality of sub-pixels having a first level;
- determining whether a black floating phenomenon has been observed in the displayed image;
- decreasing the anode initialization voltage applied to the plurality of sub-pixels by a second level based on the black floating phenomenon being observed to generate a set anode initialization voltage;
- applying the set anode initialization voltage to the plurality of sub-pixels; and
- writing a level of the set anode initialization voltage to the plurality of sub-pixels based on a determination that the black floating phenomenon has not been observed.

2. The voltage setting method of claim 1, wherein when the set anode initialization voltage is applied, determining that the black floating phenomenon has been observed.

3. The voltage setting method of claim 1, further comprising determining whether the anode initialization voltage has exceeded a predetermined minimum value.

4. The voltage setting method of claim 3, wherein the determining of whether the anode initialization voltage has exceeded the predetermined minimum value is performed after the decreasing of the anode initialization voltage by the second level.

5. The voltage setting method of claim 3, wherein the applying of the set anode initialization voltage is performed based on a determination that the anode initialization voltage has exceeded the predetermined minimum value.

6. The voltage setting method of claim 5, further comprising setting the anode initialization voltage to a third level based on a determination that the anode initialization voltage has not exceeded the predetermined minimum value.

7. The voltage setting method of claim 6, further comprising:

- applying the anode initialization voltage having the third level; and determining whether the black floating phenomenon has been observed as the anode initialization voltage having the third level is applied.

8. The voltage setting method of claim 7, further comprising:

based on the black floating phenomenon being observed as the anode initialization voltage having the third level is applied, increasing a level of the data voltage for displaying the image having the black grayscale by a second level; and determining whether the black floating phenomenon has been observed as the data voltage increased by the second level is applied.

9. The voltage setting method of claim 8, wherein, based on the determination that the black floating phenomenon has been observed as the data voltage increased by the second level is applied, the level of the data voltage for displaying the image having the black grayscale is increased by the second level.

10. The voltage setting method of claim 8, further comprising writing the level of a set data voltage for displaying the image having the black grayscale to the display device based on a determination that the black floating phenomenon has not been observed as the data voltage increased by the second level is applied.

11. The voltage setting method of claim 10, wherein, in the writing of the level of the set data voltage for displaying the image having the black grayscale to the display device, the level of the anode initialization voltage is written as the third level to the display device.

12. The voltage setting method of claim 7, further comprising:

based on the black floating phenomenon not being observed as the anode initialization voltage having the third level is applied, decreasing the level of the data voltage for displaying the image having the black grayscale by a third level; and determining whether the black floating phenomenon has been observed as the data voltage decreased by the third level is applied.

13. The voltage setting method of claim 12, wherein, based on the determination that the black floating phenomenon has not been observed as the data voltage decreased by the third level is applied, the level of the data voltage for displaying the image having the black grayscale is decreased by the third level.

14. The voltage setting method of claim 12, comprising:

increasing the level of the data voltage for displaying the image having the black grayscale by the third level based on a determination that the black floating phenomenon has not been observed as the data voltage increased by the third level is applied; and writing the level of the data voltage for displaying the image having the black grayscale to the display device.

15. The voltage setting method of claim 14, wherein, in the writing the level of the data voltage for displaying the image having the black grayscale to the display device, the level of the anode initialization voltage is written as the third level to the display device.

16. The voltage setting method of claim 1, wherein at least one of the plurality of sub-pixels includes:

a sub-pixel circuit configured to generate a driving current; and a light emitting element connected to the sub-pixel circuit, the light emitting element having the driving current flowing therethrough, and wherein the sub-pixel circuit includes an initialization transistor configured to switch an electrical connection between the light emitting element and a power line to which the anode initialization voltage is applied.

17. The voltage setting method of claim 16, wherein the power line to which the anode initialization voltage is applied is a fourth power line, wherein the light emitting element includes:

a first electrode connected to the initialization transistor;

a second electrode connected to a second power line to which a second power voltage is applied; and a light emitting layer located between the first electrode and the second electrode, and wherein a voltage difference between the first level and the second power voltage is lower than a threshold voltage of the light emitting element.

18. The voltage setting method of claim 16, wherein the display device further includes:

a display panel having the plurality of sub-pixels located therein;

a power supply circuit configured to supply the anode initialization voltage to the display panel; and a timing controller configured to control the power supply circuit, and wherein, in the writing of the level of the set anode initialization voltage to the display device, the level of the anode initialization voltage is written to a memory of the timing controller.

19. The voltage setting method of claim 18, wherein the level of the data voltage for displaying the image having the black grayscale is further stored in the memory of the timing controller.

20. An electronic device comprising:

a display panel having a plurality of sub-pixels therein, the display panel, wherein an anode initialization voltage is applied to the plurality of sub-pixels;

a data driving circuit configured to supply a data voltage to the plurality of sub-pixels;

a power supply circuit configured to supply the anode initialization voltage to the plurality of sub-pixels; and a timing controller configured to control the data driving circuit with reference to a memory, and to control the anode initialization voltage outputted from the power supply circuit to have a predetermined level, wherein the predetermined level is set by:

setting the data voltage for displaying an image having a black grayscale to a first level to the plurality of sub-pixels;

applying the anode initialization voltage having a first level to the plurality of sub-pixels;

determining whether a black floating phenomenon in a displayed image has been observed;

decreasing the anode initialization voltage applied to the plurality of sub-pixels by a first level based on a determination that the black floating phenomenon has been observed to generate a set anode initialization voltage;

applying the set anode initialization voltage to the plurality of sub-pixels; and writing a level of the set anode initialization voltage to the plurality of sub-pixels based on a determination that the black floating phenomenon has not been observed.

* * * * *